(12) United States Patent
Mise et al.

(10) Patent No.: US 8,700,860 B2
(45) Date of Patent: Apr. 15, 2014

(54) INFORMATION PROCESSING APPARATUS, METHOD AND COMPUTER PROGRAM

(75) Inventors: Ryoko Mise, Yokohama (JP); Akiyoshi Momoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 779 days.

(21) Appl. No.: 12/899,371

(22) Filed: Oct. 6, 2010

(65) Prior Publication Data

US 2011/0093667 A1    Apr. 21, 2011

(30) Foreign Application Priority Data

Oct. 16, 2009   (JP) ................................. 2009-239869
Oct. 19, 2009   (JP) ................................. 2009-240872

(51) Int. Cl.
*G06F 12/00* (2006.01)
*G06F 13/00* (2006.01)
*G06F 13/28* (2006.01)

(52) U.S. Cl.
USPC ....................................................... 711/137

(58) Field of Classification Search
USPC ....................................................... 711/137
See application file for complete search history.

(56) References Cited

U.S. PATENT DOCUMENTS

| | | | |
|---|---|---|---|
| 7,103,757 B1 * | 9/2006 | Kashyap | 712/237 |
| 7,266,254 B2 | 9/2007 | Ishikawa et al. | |
| 7,822,296 B2 | 10/2010 | Ishikawa et al. | |
| 2001/0003822 A1 * | 6/2001 | Hibi et al. | 709/100 |
| 2003/0093647 A1 * | 5/2003 | Mogi et al. | 712/1 |
| 2009/0202161 A1 | 8/2009 | Ishikawa et al. | |
| 2009/0208139 A1 | 8/2009 | Ishikawa et al. | |
| 2010/0209010 A1 | 8/2010 | Kato et al. | |

FOREIGN PATENT DOCUMENTS

| | | |
|---|---|---|
| JP | 07-105084 A | 4/1995 |
| JP | 2009-116400 A | 5/2009 |

OTHER PUBLICATIONS

Japanese Office Action dated Jul. 5, 2013 in Japanese Patent Application No. 2009-240872.
P. Viola, et al., "Robust Real-time Object Detection", Second International Workshop on Statistical and Computational Theories of Vision—Modeling, Learning, Computing, and Sampling, pp. 1-25, Jul. 13, 2001.

* cited by examiner

*Primary Examiner* — Matthew Bradley
*Assistant Examiner* — Craig Goldschmidt
(74) *Attorney, Agent, or Firm* — Fitzpatrick, Cella, Harper & Scinto (57) ABSTRACT

An information processing apparatus for processing input data using multiple items of reference data in succession is provided. The apparatus includes a secondary storage unit configured to store the reference data; a primary storage unit accessible at a speed higher than that of the secondary storage unit; a read-out unit configured to read out the reference data from the secondary storage unit to the primary storage unit; an execution unit configured to execute processing of the input data using the reference data in the primary storage unit; a determination unit configured to determine, based upon at least one of a probability that reference data scheduled for use by the execution unit will change and quantity of the scheduled reference data, whether the scheduled reference data is to be prefetched; and a control unit configured to control prefetch based on the result of determination of the determination unit.

8 Claims, 11 Drawing Sheets

| DICTIONARY NAME | CHANGE PROBABILITY | DATA AMOUNT (KB) |
|---|---|---|
| DICTIONARY DATA A | 0.3 | 20 |
| DICTIONARY DATA B | 0.5 | 40 |
| DICTIONARY DATA C | 0.7 | 60 |

INFORMATION PROCESSING APPARATUS, METHOD AND COMPUTER PROGRAM

BACKGROUND OF THE INVENTION

1. Field of the Invention

The present invention relates to an information processing apparatus, method and computer program.

2. Description of the Related Art

In a conventional information processing apparatus such as a digital camera or printer, a specific object is detected in input image data and the detected object is subjected to the appropriate processing. Face detection is an example of processing for detecting a specific object. A variety of methods for carrying out face detection have been proposed. One of these is described in P. Viola and M. Jones, "Robust Real-time Object Detection", SECOND INTERNATIONAL WORKSHOP ON STATISTICAL AND COMPUTATIONAL THEORIES OF VISION", Jul. 13, 2001. The method is referred to as the "Viola and Jones Method". An overview of the Viola and Jones Method will be described with reference to FIG. 6. According to the Viola and Jones Method, input image data 600 is subjected to multiple stages of verification. Here it is assumed that three stages of verification, namely verification A (610), verification B (611) and verification C (612), are carried out. At each stage of verification, a judgment is made as to whether the image data 600 is that of a face or non-face. Image data 600 that has been determined to be "false" at any stage of verification is judged to be that of a non-face and is not subjected to any further processing. On the other hand, image data 600 that has been determined to be "true" at all stages of verification is judged to be that of a face. Each stage of verification is conducted using dictionary data. Dictionary data is a parameter such as a feature amount necessary for verification or a threshold value used as a criterion for the true-or-false determination. For example, in a case where the image data 600 is that of a face and a small rectangle in the region of both eyes is compared with a small rectangle below the eye region, the fact that the former is darker is a feature. Accordingly, values for designating both rectangular regions and a threshold value for comparison with the difference between the brightnesses are given as dictionary data.

Figure 6:
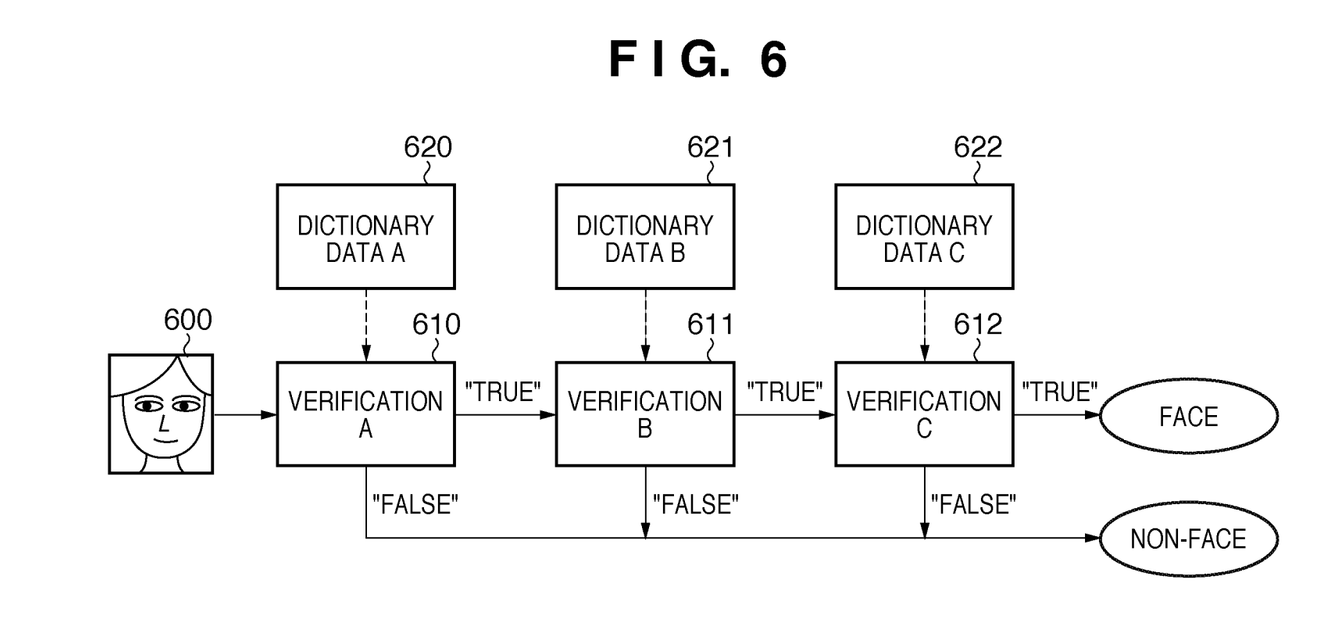
FIG. 6 is a diagram for describing an overview of the Viola and Jones Method.

When face detection is performed using the Viola and Jones Method, it is desired that the processing be executed at high speed. Recent models of information processing apparatus generally include a high-speed, high-cost primary storage device and a low-speed, low-cost secondary storage device. If all of the dictionary data used in verification is retained in the primary storage device, face detection can be performed at very high speed. However, in a cost-sensitive information processing apparatus such as a digital camera, it is desired that the storage capacity of the primary storage device be reduced in order to implement face detection at low cost. To achieve this, use is made of a method in which dictionary data being held in the secondary storage device is read out to the primary storage device when necessary. When processing is executed using reference data successively at such time, the general practice is to perform a prefetch operation in which reference data scheduled for use at the next stage of processing is read out to the primary storage device in advance. Using prefetch makes it possible to speed up verification while reducing the size of the primary storage device. For example, the overall processing speed for face detection can be raised by prefetching the dictionary data C (622) to the primary storage device before verification B (611) ends.

In face detection, however, dictionary data scheduled for use at the next stage of processing in the manner described above changes depending upon the result of verification. For example, assume that prefetch of dictionary data C (622) starts before verification B (611) ends. If the result of verification B (611) is "false" in such case, then face detection applied to this image data ends and processing of the following data begins. Since the dictionary data necessary for the next verification stage is the dictionary data A (620), the time is takes for read-out of the dictionary data C (622) to be completed is wasted in a case where prefetch of the dictionary data C (622) cannot be ended forcibly. Further, even in a case where prefetch can be ended forcibly, there are also instances where other dictionary data being held in the primary storage device is overwritten by the dictionary data C (622). In other words, in a case where prefetch is always carried out, the greater the number of times the result of verification is "false", the greater the number of times wasteful read-out of dictionary data is performed and the greater the number of re-loads of dictionary data that has been overwritten because of wasteful read-out of dictionary data. An aspect of the present invention provides information processing technology for speeding up processing while reducing the size of the primary storage device. Another aspect of the present invention reduces wasteful prefetch and shortens waiting time due to parameter loading.

SUMMARY OF THE INVENTION

According to one aspect of the present invention, an image processing apparatus for processing input data using multiple items of reference data in succession, comprising: a secondary storage unit configured to store the multiple items of reference data; a primary storage unit accessible at a speed higher than that of the secondary storage unit; a read-out unit configured to read out the reference data, which is used in the processing, from the secondary storage unit to the primary storage unit; an execution unit configured to execute processing of the input data using the reference data that has been read out to the primary storage unit; a determination unit configured to determine, based upon at least one of a probability that reference data scheduled for use by the execution unit will change and quantity of the scheduled reference data, whether the scheduled reference data is to be prefetched by the read-out unit; and a control unit configured to control prefetch to be performed by the read-out unit based on the result of determination of the determination unit.

According to another aspect of the present invention, an information processing apparatus for verifying data indicating an input image using a parameter held in a parameter storage unit, comprising: a processing log storage unit configured to store result of the verification; a determination unit configured to determine, in accordance with the stored result of verification, whether a parameter used in a next stage of verification is to be prefetched; and an acquisition unit configured to acquire, based upon the result of the determination, the parameter used in the next stage of verification.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will be described with reference to the accompanying drawings. The present invention is applicable to an information processing apparatus that executes processing of input data using multiple items of reference data in succession. In the embodiments that follow, such an information processing apparatus is an information processing apparatus 100 to which multiple items of image data are applied as input data and an object represented by each item of image data is subjected to face detection using the Viola and Jones Method. Accordingly, dictionary data is dealt with as reference data and verification of image data is dealt with as the processing of the input data. If the result of verification is "true", the next item of dictionary data is used in regular order. If the result of verification is "false", however, then, rather than using the next dictionary data, the dictionary data at the beginning is used with respect to the next item of image data. Verification may be applied to a moving image as well, and in such case verification would be carried out with regard to each frame of the moving image.

<First Embodiment>

Figure 1:
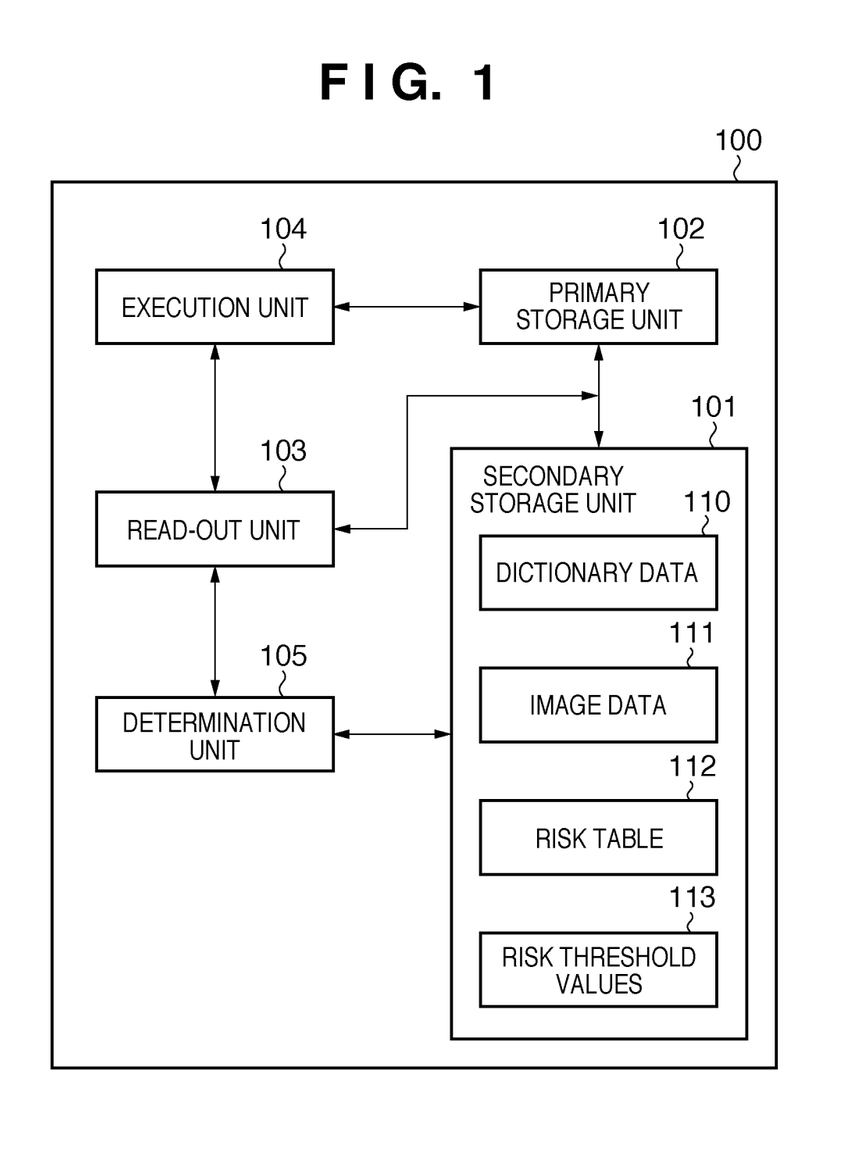
FIG. 1 is an exemplary functional block diagram illustrating a first embodiment of the present invention.

FIG. 1 is a functional block diagram of the exemplary information processing apparatus 100 according to this embodiment and will be used to describe the embodiment. The information processing apparatus 100 includes a secondary storage unit 101, a primary storage unit 102, a read-out unit 103, an execution unit 104 and a determination unit 105.

The secondary storage unit 101 holds dictionary data 110, image data 111, a risk table 112 and risk threshold values 113. The dictionary data 110 is data used in verification processing of the image data 111, as mentioned above, and includes feature amounts and threshold values, by way of example. For instance, coordinate values of two rectangular areas that are vertically adjacent each other in image data are given as feature amounts. A threshold value to be compared with a brightness differential between the two areas is given as the threshold value. Although the dictionary data 110 typically differs for every stage of verification, the present invention is applicable even if redundant dictionary data 110 is included. The secondary storage unit 101 generally holds multiple items of the dictionary data 110. The primary storage unit 102 is a storage unit accessible at a speed higher than that of the secondary storage unit 101. The read-out unit 103 reads the dictionary data 110 and image data 111 from the secondary storage unit 101 to the primary storage unit 102 in order to subject the image data 111 to face detection processing. There are cases where the read-out unit 103 reads out dictionary data 110 used at the next stage of verification after a stage of verification ends, and cases where the read-out unit 103 prefetches dictionary data 110 scheduled for use at the next stage of verification before a stage of verification ends. The read-out unit 103 notifies the execution unit 104 of completion of read-out of the dictionary data 110. In a case where dictionary data 110 to be read out is already being held in the primary storage unit 102, the read-out unit 103 need not read out the dictionary data 110 redundantly. Further, in a case where the total data amount of dictionary data 110 being held in the primary storage unit 102 exceeds a preset threshold value, the read-out unit 103 writes dictionary data 110, which will be read out anew, over dictionary data 110 read out in the past.

The execution unit 104 executes verification of the input data using the dictionary data 110 read out to the primary storage unit 102 and outputs the result of verification to the read-out unit 103. In the example above, the execution unit 104 calculates the sum total of the pixel values in each of the areas and computes the difference between the totals. The execution unit 104 compares the difference with a threshold value and outputs "true" as the result of verification if the difference is greater than the threshold value. On the basis of the result of processing, the read-out unit 103 determines the dictionary data 110 to be read out next. The determination unit 105 receives a request from the read-out unit 103 and determines whether to prefetch dictionary data 110 scheduled for use at the next stage of processing. The determination unit 105 sends the result of determination back to the read-out unit 103. The determination unit 105 determines whether or not to prefetch dictionary data based upon the risk table 112 and risk threshold values 113. The details of the risk table 112 and risk threshold values 113 will be described later. In order to raise the speed of face detection, the read-out unit 103 may just as well read the risk table 112 and risk threshold values 113 from the secondary storage unit 101 to the primary storage unit 102.

Figure 2:
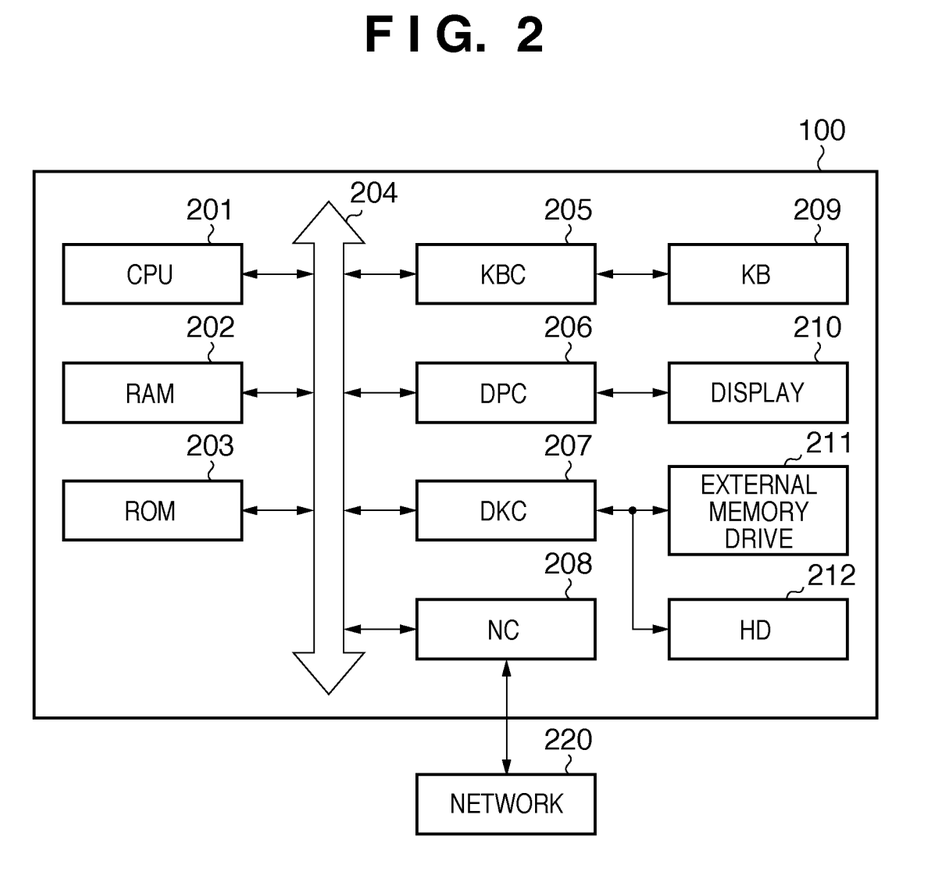
FIG. 2 is an exemplary hardware block diagram illustrating the first embodiment of the present invention.

FIG. 2 is an example of a hardware block diagram illustrating the exemplary information processing apparatus 100. FIG. 2 illustrates an example of an arrangement for implementing the information processing apparatus 100 corresponding to the embodiment of the present invention. Components other than those related to the information processing apparatus 100 are omitted in order to simplify the description. Although a personal computer is assumed to be the information processing apparatus 100 in FIG. 2, the apparatus may just as well be a digital camera or printer or the like.

A CPU 201, which is, for example, a microprocessor, controls the information processing apparatus 100 based upon a computer program and data, etc., stored in a ROM 203, on a hard disk (HD) 212 and on a storage medium that has been placed in an external memory drive 211. A RAM 202 functions as the work area of the CPU 201 and holds a program stored in the ROM 203 or hard disk 212 or the like. The RAM 202 functions as the primary storage unit 102, by way of example. A computer program and the like executed by the CPU 201 and illustrated in a flowchart described later has been stored in the ROM 203, on a storage medium placed in the external memory drive 211 or on the hard disk 212.

A keyboard controller (KBC) 205 controls inputs from a keyboard (KB) 209 and from a pointing device such as a mouse (not shown). A display controller (DPC) 206 controls a display on a display unit 210. A disk controller (DKC) 207 controls access to the hard disk 212 and external memory drive 211 and reads and writes various programs and various data such as font data, user files and edit files from and to these storage media. The hard disk 212 functions as the secondary storage unit 101, by way of example. A network controller (NC) 208 carries out communication with a network 220. Image data 111 may be acquired via the network 220.

The operation of the information processing apparatus 100 will be described with reference to the flowchart shown in FIG. 3. The operation shown in this flowchart is executed as a result of the CPU 201 processing the computer program that has been written to the ROM 203, by way of example.

At step S301, one item of image data from among multiple items of input image data 111 held in the secondary storage unit 101 is read out to the primary storage unit 102 by the read-out unit 103. The execution unit 104 subjects the read-out image data 111 to verification using multiple items of dictionary data 110 successively and determines whether the image data is that of a face. In this embodiment, it is assumed that the three dictionaries represented by the dictionary data A, dictionary data B and dictionary data C are used in regular order. However, this does not impose a limitation upon the present invention.

At step S302, the read-out unit 103 determines whether dictionary data 110 that will be used at the next stage of verification has been stored in the primary storage unit 102. If this dictionary data 110 has been stored ("YES" at step S302), processing proceeds to step S306. If this dictionary data 110 has not been stored ("NO" at step S302), then processing proceeds to step S303 and the read-out unit 103 determines whether the dictionary data 110 of interest is undergoing prefetch. If prefetch is in progress ("YES" at step S303), processing proceeds to step S305 and the read-out unit 103 waits until read-out is completed. If prefetch is not in progress ("NO" at step S303), then processing proceeds to step S304. In step S304, the read-out unit 103 reads out the dictionary data 110 that will be used in the next stage of verification from the secondary storage unit 101 to the primary storage unit 102. The read-out at step S304 is not a prefetch; it is an ordinary read-out for reading out dictionary data 110 whose use in the next stage of verification has been definitely decided. At step S305, the read-out unit 103 determines whether read-out of the dictionary data 110 has been completed. If read-out has not been completed ("NO" at step S305), the read-out unit 103 repeats step S305. If read-out has been completed ("YES" at step S305), then processing proceeds to step S306. By thus omitting read-out in a case where the dictionary data 110 has already been stored in the primary storage unit 102 or in a case where prefetch has already begun, processing time needed for face detection can be shortened.

At step S306, the execution unit 104 subjects the image data 111 to verification using dictionary data 110. At step S307, the determination unit 105 determines whether or not to prefetch dictionary data 110. The details of this processing will be described later. If prefetch has been determined ("YES" at step S307), processing proceeds to step S308 and the read-out unit 103 prefetches dictionary data. If it has been determined not to perform prefetch ("NO" at step S307), then processing proceeds to step S309 and the read-out unit 103 does not prefetch the dictionary data. If prefetch is performed, the read-out unit 103 begins read out of reference data, which is scheduled for use at the next stage of verification, from the secondary storage unit 101 to the primary storage unit 102. For example, in a case where the execution unit 104 has begun verification using the dictionary data A at step S306, the read-out unit 103 reads out the dictionary data B at step S308. Further, in a case where the execution unit 104 has begun verification using the dictionary data C at step S306, the read-out unit 103 may prefetch the dictionary data A at step S308. The reason for this is that the stage of verification using the dictionary data A, which is at the beginning of the order of dictionary data, is applied to the next image data 111 following the conclusion of the stage of verification using dictionary data C, which is at the tail end of the order of dictionary data. Prefetch is begun before verification by the execution unit 104 ends.

Following the end of verification, the read-out unit 103 determines at step S309 whether the result of verification is "true". If the result of verification is "true" ("YES" at step S309), processing proceeds to step S310 and the read-out unit 103 determines whether the processing of the dictionary data 110 at the tail end of the order of dictionary data has ended with respect to the image data 111 currently being processed. If processing of the dictionary data 110 at the tail end of the order of dictionary data has not ended ("NO" at step S310), then processing returns to step S302 in order that verification may be performed using the dictionary data 110 that is next in the order of dictionary data. For example, in a case where processing of the dictionary data A has ended, verification using the dictionary data B that is next in the order of dictionary data is performed. If processing of the dictionary data 110 at the tail end of the order of dictionary data has ended ("YES" at step S310), this means that the result of verification is "true" with regard to all of the dictionary data 110 and therefore the read-out unit 103 determines that the image data 111 is that of a face. Processing then proceeds to step S311. If the result of verification is "false" ("NO" at step S309), on the other hand, then the read-out unit 103 determines that the image data 111 is that of a non-face and processing proceeds to step S111.

At step S311, the read-out unit 103 determines whether image data that has not yet undergone determination is being held in the secondary storage unit 101. If such image data is being held ("YES" at step S311), processing returns to step S301 and the read-out unit 103 reads out this as yet undetermined image data to the primary storage unit 102. If such image data is not being held ("NO" at step S311), then processing ends.

The details of the prefetch determination at step S307 in FIG. 3 will now be described using the example of the risk table 112 shown in FIG. 4. Dictionary name 401 indicates the names of the dictionary data 110 used in verification. Change probability 402 indicates the probability that dictionary data 110 scheduled for use at the next stage of verification will change as a result of performing verification using the dictionary data 110 listed under dictionary name 401. Data amount 403 indicates the quantity of data of the listed dictionary data 110.

In a case where the result of verification becomes "false" after prefetch of dictionary data 110 has begun, that is, in a case where dictionary data 110 scheduled for use at the next stage of verification changes, there are instances where the time it takes to subject the image data 111 to face detection lengthens. For example, in a case where the read-out unit 103 cannot end the read-out of dictionary data 110 forcibly, the time is takes to read out all of the dictionary data 110 not necessary for verification at the next stage of verification is time wasted. Further, there are also cases where the read-out unit 103 overwrites dictionary data 110 already being held in the primary storage unit 102. The higher the change probability 402, the greater the possibility that prefetched dictionary data 110 will be wasteful. Further, the greater the data amount 403 of the dictionary data 110 that will be prefetched, the longer the time needed for read-out and the larger the area of the primary storage unit 102 that will be overwritten. Accordingly, the determination unit 105 in this embodiment performs the prefetch determination based upon at least either of change probability 402 or data amount 403. By way of example, these values are specified by previous learning and are stored in the secondary storage unit 101 as the risk table 112 before face detection is carried out. In face detection, the probability that the result of verification using each of the dictionaries of the dictionary data 110 will be "true" is learned beforehand.

Figure 3:
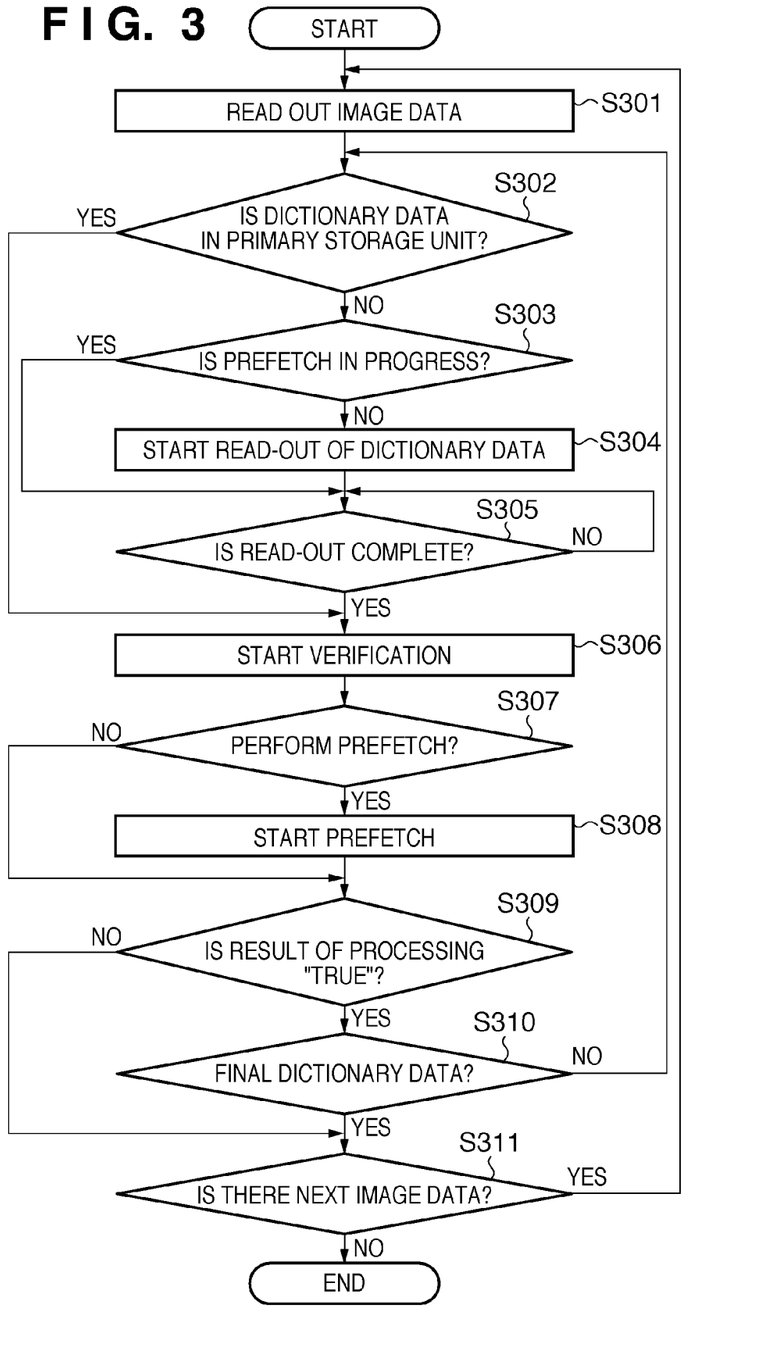
FIG. 3 is a flowchart for describing operation exemplifying the first embodiment of the present invention.

The determination unit 105 defines the product of change probability 402 of dictionary data 110, which is currently in use for verification that has begun at step S306 in FIG. 3, and data amount 403 of the dictionary data 110 that will be used in the next stage of verification as a risk value. If this risk value is less than risk threshold value 113, the determination unit 105 determines that prefetch is to be performed. For example, assume that the risk threshold value 113 has been set to 20.0. In this case, if the execution unit 104 has begun verification using dictionary data A at step S306 in FIG. 3, the determination unit 105 determines at step S307 that the dictionary data B is to be prefetched. The reason is that the risk value in this case is 0.3×40=12.0, which is less than the risk threshold value 113. On the other hand, if the execution unit 104 has begun verification using dictionary data B at step S306 in FIG. 3, then the determination unit 105 determines at step S307 that the dictionary data C is not to be prefetched. The reason is that the risk value in this case is 0.5×60=30.0, which is greater than the risk threshold value 113. It should be noted that the definition of the risk value is not limited to the product of the change probability 402 and data amount 403. In general, the risk value is set as a function value of a function which increases in relation to change probability 402 and, moreover, increases in relation to data amount 403.

Figure 4:
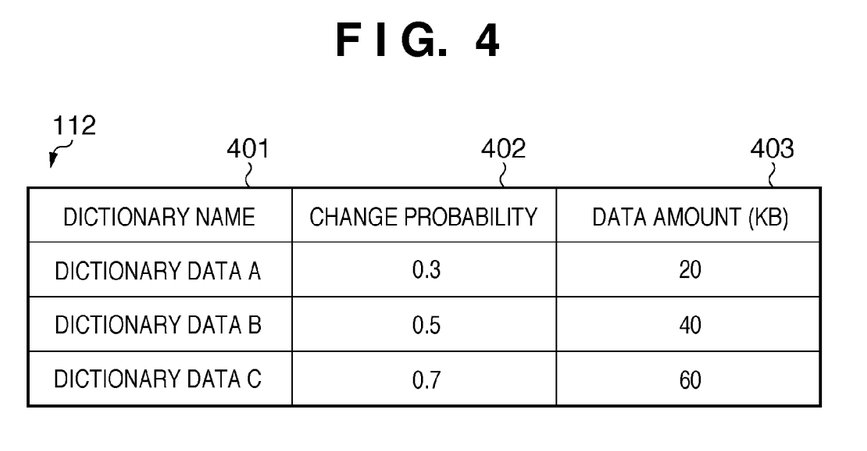
FIG. 4 is a diagram useful in describing a risk table exemplifying the first embodiment of the present invention.

In the example illustrated in FIG. 4, the example discussed is one in which the prefetch determination is made based upon both change probability 402 and data amount 403. However, the prefetch determination may just as well be made based upon the change probability 402 alone or the data amount 403 alone. In a case where the determination is based solely upon change probability 402, the determination unit 105 compares change probability 402 with the risk threshold value 113 and determines to prefetch dictionary data if change probability 402 is less than the threshold value 113. In a case where the determination is based solely upon data amount 403, the determination unit 105 compares data amount 403 with the risk threshold value 113 and determines to prefetch dictionary data if data amount 403 is less than the risk threshold value 113.

Rather than having the user or seller of the information processing apparatus 100 or some other party store the risk table 112 and risk threshold value 113 in the secondary storage unit 101, a binary value indicating whether prefetch is to be performed or not may be stored in correlation with each item of dictionary data 110. Further, if the risk values are arranged in ascending order, then, from among the items of dictionary data 110 whose risk values are smaller than the risk threshold value 113, these may be stored in the secondary storage unit 101 in order of descending age. Further, the information processing apparatus 100 may update the change probability 402 as face detection applied to the image data 111 progresses. Furthermore, in a case where the dictionary data 110 is stored in a plurality of secondary storage units 101 and the times at which each of the dictionaries of the dictionary data 110 are read out to the primary storage unit 102 differ, the read-out times may just as well be appended to the data amount 403. Further, in a case where there are multiple targets of recognition or in a case where modes are in effect when the image data 111 is acquired, a different risk table 112 and different risk threshold value 113 may be set with regard to each. Based upon the recognition target or mode or the like, the determination unit 105 may change over the risk table 112 and risk threshold values 113 utilized.

The time involved in processing in cases where prefetch is performed will be described with reference to FIGS. 5A, 5B and FIG. 6. It is assumed that the information processing apparatus 100 performs face detection successively with regard to three items of image data, namely image data A (500), image data B (501) and image data C (502). In face detection it is assumed that stages of verification, namely verification A (610), verification B (611) and verification C (612), are carried out successively and that the dictionaries of dictionary data A (620), dictionary data B (621) and dictionary data C (622) are used for the respective stages of verification. It is assumed that image data A (500) is data found to be "false" by verification A (610), that image data B (501) is data found to be "false" by verification B (611), and that image data C (500) is data found to be "true" by verification C (612). Further, it is assumed that each stage of verification ends in one cycle and that read-out of dictionary data A (620), dictionary data B (621) and dictionary data C (622) to the primary storage unit 102 requires a length of two cycles, a length of three cycles and a length of four cycles, respectively. For the sake of explanation, it is assumed that the primary storage unit 102 can store up to two dictionaries of dictionary data 110 and that if more than two dictionaries of dictionary data 110 are to be stored, then the read-out unit 103 overwrites the dictionary data 110 that has been stored in the primary storage unit 102 the longest. It should be noted that the read-out unit 103 may overwrite old dictionary data 110 in a case where the total data amount dictionary data 110 that has been read out to the primary storage unit 102 exceeds a prescribed threshold value.

Figure 5A:
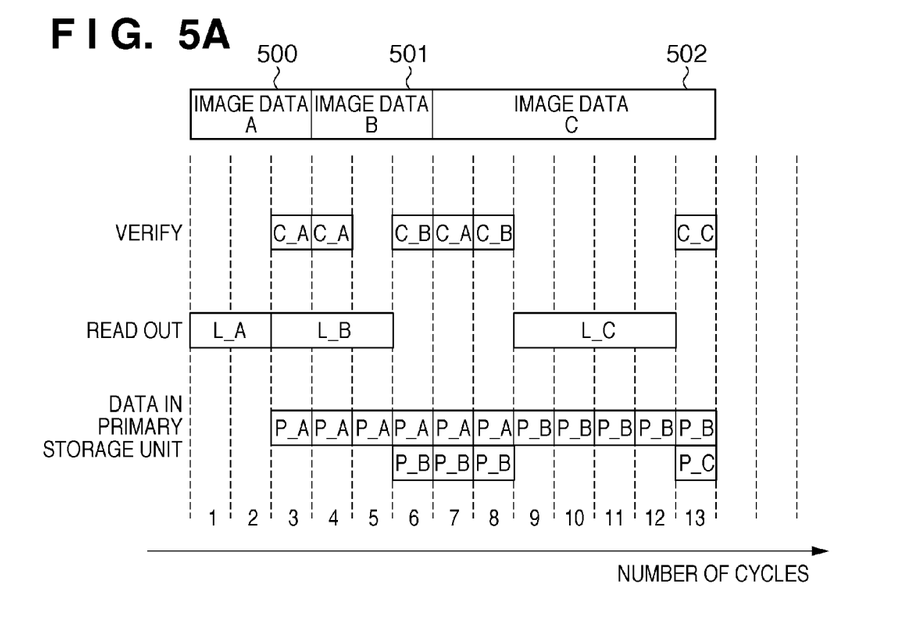
FIGS. 5A and 5B are time charts exemplifying processing time in the first embodiment of the present invention.

FIG. 5A is an example of a time chart in a case where prefetch has been performed in accordance with this embodiment. For example, C_A represents verification using the dictionary data A (620), L_A represents read-out of dictionary data A (620), and P_A represents the fact that the dictionary data A (620) is being held in the primary storage unit 102. The read-out unit 103 starts reading out the dictionary data A (620) in the first cycle attendant upon the start of face detection applied to the image data A (500). Read-out of the dictionary data A (620) is completed in the second cycle and the execution unit 104 executes verification A (610) using the dictionary data A (620) read out to the primary storage unit 102 in the third cycle. As mentioned above, the risk value in this case is smaller than the risk threshold value 113 and therefore the read-out unit 103 begins prefetching the dictionary data B (621), which is dictionary data scheduled for use next. Since the result of verification A (610) is "false", the execution unit 104 determines that the image data A (500) is that of a non-face and begins the processing of the next image data B (501). In the sixth cycle, on the other hand, the risk value is greater than the risk threshold value 113 and therefore the read-out unit 103 does not prefetch the dictionary data C (622), as described earlier. As a result, since the dictionary data A (620) being held in the primary storage unit 102 is not overwritten, verification A (610) of the image data C (502) can begin in the seventh cycle.

Figure 5B:
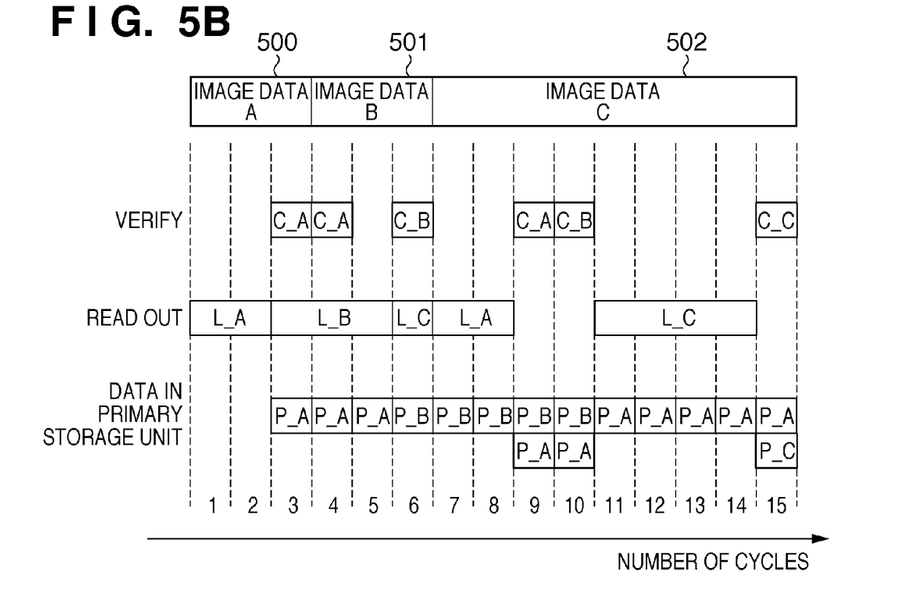

FIG. 5B is an example of a time chart in a case where prefetch has been performed at all stages of verification. Since read-out of dictionary data C (622) begins in the sixth cycle, the dictionary data A (620) that has been stored in the primary storage unit 102 is overwritten. As a consequence, it is necessary to read out the dictionary data A (620) in the seventh cycle and it takes 15 cycles until face detection applied to the image data C (502) ends.

Thus, in accordance with this embodiment, it is possible to process face detection at high speed while the size of the primary storage unit 102 is reduced.

<Second Embodiment>

Figure 7:
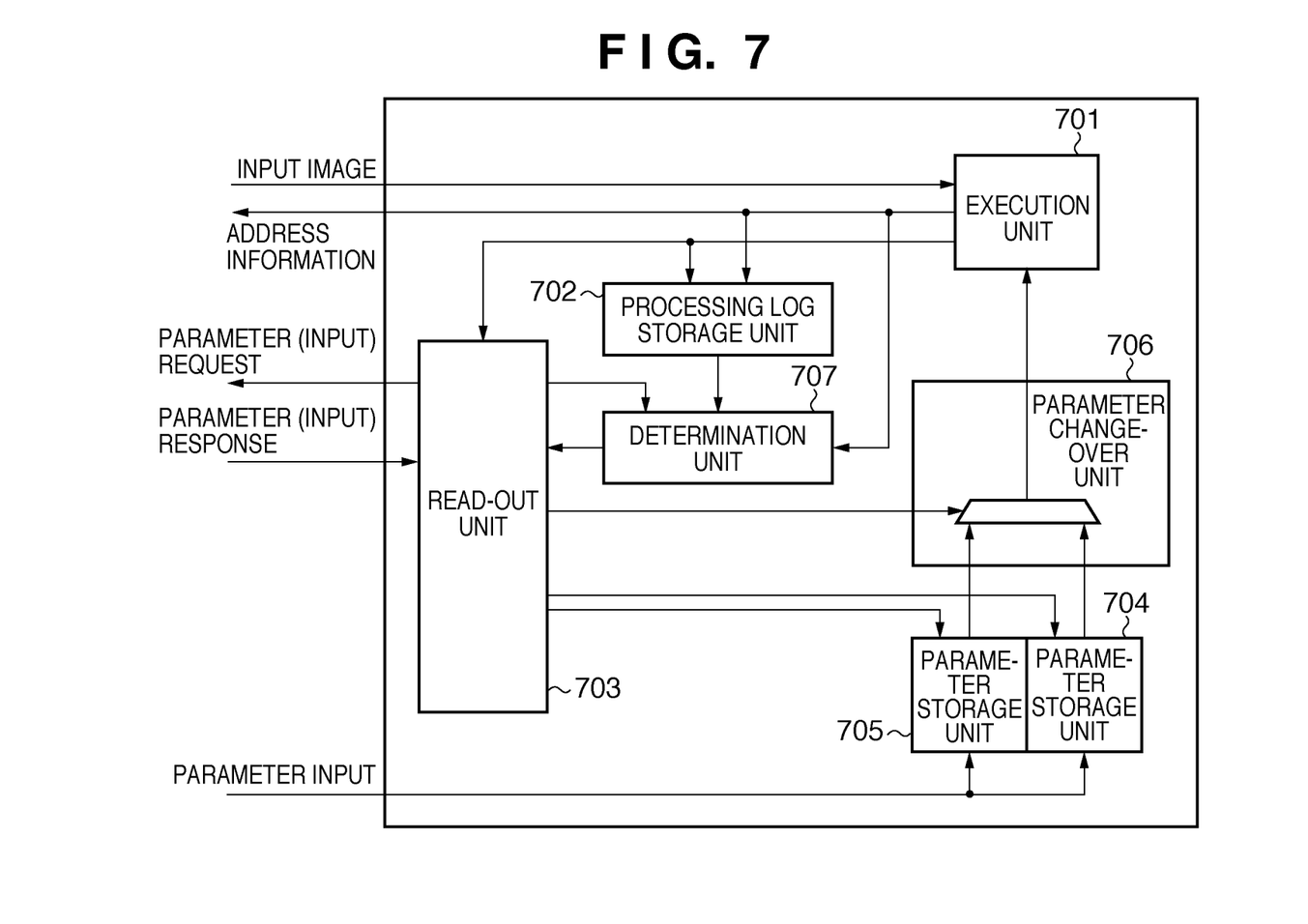
FIG. 7 is a block diagram illustrating the configuration of an information processing apparatus according to a second embodiment of the present invention.

FIG. 7 is a block diagram illustrating the configuration of an information processing apparatus according to a second embodiment of the present invention. An execution unit 701 in FIG. 7 receives a rectangular image of a frame currently undergoing processing and dictionary data necessary in the step currently being processed, performs verification and outputs the result of verification.

A processing log storage unit 702 holds the result of processing that has been output from the execution unit 701. A read-out unit 703 senses dictionary data necessary next by receiving the result of processing that has been output from the execution unit 701. Here the read-out unit 703 loads the necessary dictionary data in a case where the necessary dictionary data is not being held in either a parameter storage unit 704 or a parameter unit 705. In order to load the dictionary data, the read-out unit 703 outputs a parameter-input request to a controller (not shown). When a parameter-input response to the parameter-input request is received, the read-out unit 703 outputs a parameter-load permission signal to the parameter storage unit 704 or 705. As a result, the parameter storage unit 704 or 705 that has received the parameter-load permission signal loads the parameter that will be input.

In a case where loading of the necessary dictionary data has been completed, or in a case where the necessary dictionary data is already being held in the parameter storage unit 704 or 705, the read-out unit 703 issues a parameter changeover instruction to a parameter changeover unit 706. The parameter changeover instruction is a selection signal for changing over the parameter storage unit 704 or 705 in such a manner that the execution unit 701 will operate using the necessary parameter. When changeover of the parameter ends, the execution unit 701 starts processing.

At the same time that it instructs the start of processing, the read-out unit 703 outputs the number of the step currently being processed to a determination unit 707. On the other hand, based upon the step number input thereto, the determination unit 707 determines whether to prefetch dictionary data necessary at the next step and sends the result of this determination back to the read-out unit 703. More specifically, the determination is made by receiving address information, which indicates the area currently undergoing processing, from the execution unit 701 and refers to the result of processing of the preceding frame being held in the processing log storage unit 702.

Next, upon receiving the result of a determination that prefetch is to be performed, the read-out unit 703 outputs a parameter-input request in order to request loading of the parameter necessary for the next step. Then, upon receiving a parameter-input response to the parameter-input request, the read-out unit 703 outputs a parameter-load permission signal to whichever of the parameter storage units is not being used at the present step and loads this parameter storage unit with the parameter that will be input.

The read-out unit 703 receives the result of processing from the execution unit 701 and, in a case where the result is "true", verification of the next step is carried out. In a case where the parameter of the next step is already being held in a parameter storage unit owing to the above-mentioned prefetch, the information processing apparatus can perform the verification of the next step merely by issuing the changeover instruction to the parameter changeover unit 706.

Next, information that is held in the processing log storage unit 702 will be described in detail. The result of processing that is output from the execution unit 701 is held in the processing log storage unit 702. The result of processing referred to here is composed of address information of the area that has undergone verification and the number of the final step for which a "true" result was obtained from verification of this area. The address information of the area includes information for identifying the frame and information for identifying a rectangular image area within the frame. For example, the frame number can be used as the information for identifying the frame. Further, the address of a pixel at the upper-right-hand corner of the rectangular image area can be used as the information for identifying the rectangular image area within the frame.

Next, a description will be rendered with regard to the number of the step held in the processing log storage unit 702. In a case where the result of processing in a certain area is "false" at a certain step, the result of processing up to a point preceding this step is considered to be "true". This means that the step number preceding this step will be held in the processing log storage unit 702. For example, if verification at step 3 has yielded a "false" result, step 2 will be held in the processing log storage unit 702. Similarly, if verification at step 1 has yielded a "false" result, then step 0 will be held in the processing log storage unit 702. Accordingly, in a case where verification at the final step yields a "true" result, then the number of the final step will be held in the processing log storage unit 702.

The details of the determination performed by the determination unit 707 will be described next. The determination unit 707 receives address information, which indicates the area currently undergoing processing, from the execution unit 701. On the basis of the address information received, the determination unit 707 refers to the result of processing of the preceding frame of the rectangular image area currently undergoing processing and being held in the processing log storage unit 702 and acquires the number of the final step for which the verification result of the preceding frame was "true". Furthermore, the determination unit 707 receives the number of the step currently undergoing processing from the read-out unit 703 and compares the number of the next step and the number of the step acquired from the processing log storage unit 702. If the result of the comparison is that the number of the next step is smaller than the step number acquired from the processing log storage unit 702, the determination unit 707 determines that prefetch is to be performed. The result of this determination is output to the read-out unit 703.

In case of recognition using a moving image, the result of processing of the preceding frame and the result of processing of the frame currently undergoing processing will be very close. The reason for this is that the moving speed of the recognition target, such as a face or human body, is sufficiently slow in comparison with the frame rate of the moving image. That is, there is a high likelihood that the result of processing of the frame currently undergoing processing will be "true" up to the step for which the result of processing of the preceding frame was "true". This means that it is possible to reduce needless prefetching by performing prefetch of dictionary data up to the step for which a "true" result was obtained at the preceding step.

Next, the processing time involved in recognition in the second embodiment will be described with reference to FIGS. 8 to 9. Before recognition processing time is described, terms necessary for the description will be defined. First, step processing time refers to the time it takes to perform verification of each step. Parameter loading time refers to the time necessary for dictionary data that has been stored in an external memory to be loaded into a parameter storage unit. Here an example in which parameter loading times of S1, S2 and S3 gradually increase by factors of one, two and four will be illustrated. This is because it is assumed that the number of verifications increases as the step approaches the subsequent stage. Further, an example in which all step processing times are the same will be illustrated. This is because it is possible to create the hardware in such a manner that a plurality of verifications can be executed in parallel. Further, it is assumed that step processing time and parameter loading time of S1 are the same.

Figure 8:
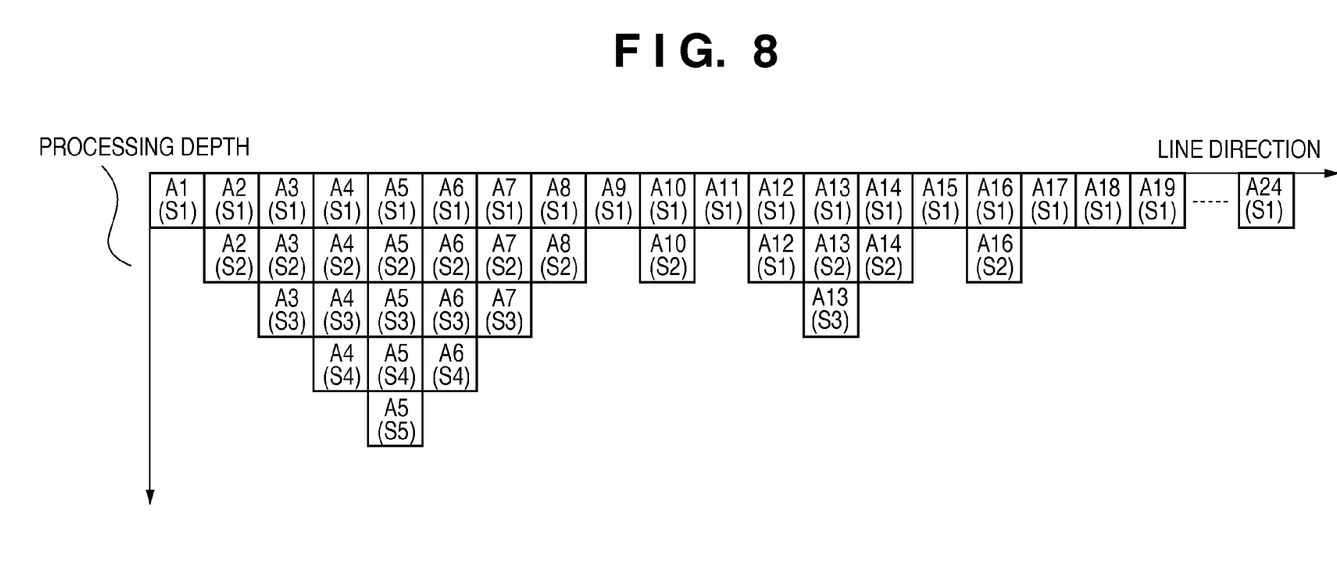
FIG. 8 is a diagram useful in describing recognition processing in the second embodiment.

FIG. 8 is a diagram useful in describing recognition in the second embodiment. The horizontal direction in FIG. 8 is the line direction and the vertical direction is the depth of verification. In this example, with regard to a rectangular image area A1 which is at the leftmost position in the line direction, verification of S1 is "true" and a succeeding verification of S2 is "false". Further, with regard to rectangular image area A2, verification of S1, S2 is "true" and verification of S3 is "false". Thus, verification of each step with regard to these rectangular image areas is carried out until a result is "false" or until all verification results are "true".

Figure 9:
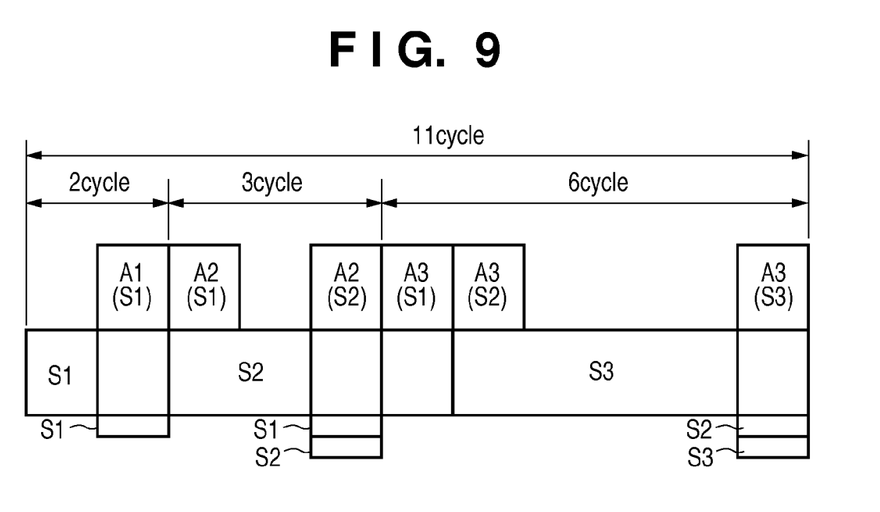
FIG. 9 is a diagram illustrating processing time in recognition processing according to the second embodiment.

FIG. 9 is a diagram illustrating recognition processing time in the second embodiment. Processing cycles at the top of the diagram are times over which the execution unit 701 executes verification. Further, the underlying A1 (S1) is a cycle regarding verification of step 1 with respect to the rectangular image area A1. The underlying S1, S2, S3 are load cycles of dictionary data. Here S1 indicates the load cycle of dictionary data used at step 1 and S2 indicates the load cycle of dictionary data used at step 2. The bottom of FIG. 9 indicates dictionary data being held in the parameter storage units 704 and 705.

In FIG. 9, first the read-out unit 703 loads the parameter necessary for S1. At the same time that the execution unit 701 performs verification of S1 with respect to A1, the determination unit 707 decides up to which step prefetch should be carried out with respect to A1 currently undergoing processing. The determination unit 707 refers to the processing log storage unit 702 to obtain the processing result in the preceding frame of A1. Here, since the processing result in the preceding frame is "true" up to S1, the determination unit 707 decides to perform prefetch of the dictionary data up to S1 in relation to A1 currently undergoing processing. The determination unit 707 then receives the number (S1) of the step currently undergoing processing from the read-out unit 703 and determines whether prefetch of the dictionary data of the next step (S2) is to be carried out. Since the received number is the same as that of the step for which it has been decided to perform prefetch, the determination unit 707 determines that prefetch of the dictionary data of the next step S2 should not be carried out. The result of the determination is sent back to the read-out unit 703 and, as a result, the read-out unit 703 does not prefetch the dictionary data of S2.

Next, the execution unit 701 performs A2 (S1), which is the next processing, if the result of A1 (S1) is "false". In a manner similar to A1, the determination unit 707 determines up to which step prefetch should be performed with respect to A2. With regard to A2, the result of verification is "true" up to S2 in the preceding frame and therefore the determination unit 707 decides that prefetch is to be performed up to S2. Furthermore, the determination unit 707 receives the number (S1) of the step currently undergoing processing from the read-out unit 703 and determines whether to prefetch the dictionary data of the next step (S2). Since the received number is not the same as that of the step for which it has been decided to perform prefetch, the determination unit 707 determines that prefetch of the dictionary data of the next step S2 should be carried out. The result of the determination is sent back to the read-out unit 703 and the read-out unit 703 prefetches the dictionary data of S2.

Next, since the result of A2 (S1) is "true" and prefetch of the dictionary data of S2 is still being performed at this time, processing waits until prefetch of the dictionary data of S2 is completed. When prefetch of the dictionary data is completed, parameter changeover is carried out and processing of A2 (S2) is executed. Since the prefetch determination result prevails up to S2 with respect to A2, the read-out unit 703 does not prefetch the dictionary data of S3. At this point in time the parameters of S1 and S2 are being held in the parameter storage units 704 and 705. When the processing result of A2 (S2) is "false", the next A3 (S1) is executed but since the parameter of S1 is being held in the parameter storage unit 704, verification can then start.

Thus, in a case where the result of processing matches the result of the prefetch determination, processing halt due to waiting for loading of dictionary data does not arise, as in the manner of a cache technique. Further, in order to perform prefetch, processing is always halted during the time that needless dictionary data is loaded, and reloading of the next dictionary data required next, which arises owing to overwriting of necessary dictionary data, is unnecessary.

In accordance with this embodiment, therefore, 11 cycles are required for the processing of A3 (S3) to end. This means that processing can be performed more quickly.

Figure 10:
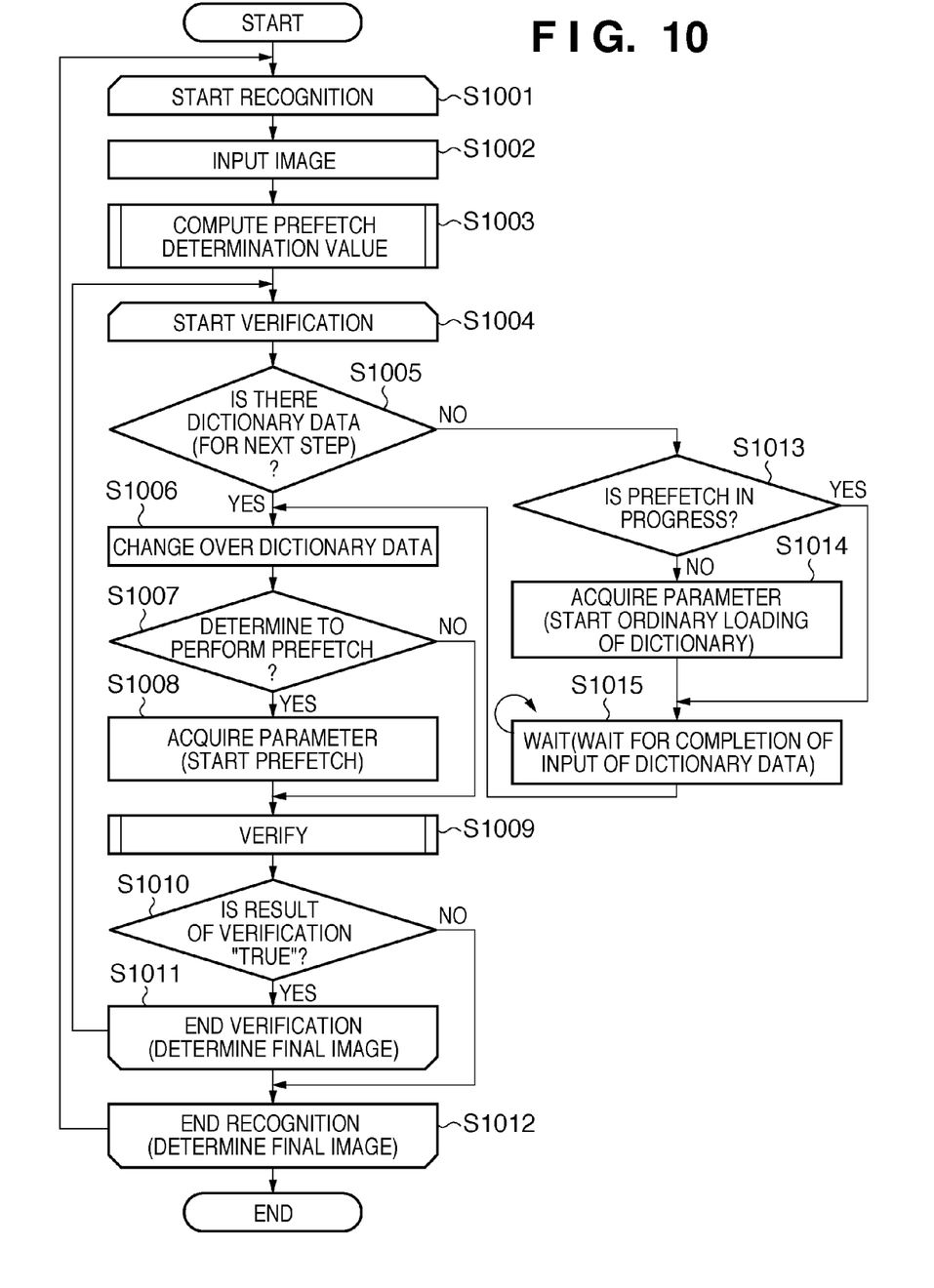
FIG. 10 is a flowchart illustrating recognition processing executed by the information processing apparatus of the second embodiment.

Next, recognition performed by the information processing apparatus of this embodiment will be described in detail with reference to FIG. 10. Recognition is carried out at S1001 to S1015. When recognition starts at S1001, data of an extracted (or address-designated) rectangular image area is input at S1002. A prefetch determination value is computed with regard to entered data (input data) at S1003. In the computation of the prefetch determination value, up to which step prefetch should be performed is decided with regard to the input data. Here prefetch is performed up to processing of a step for which processing of data that was input one frame earlier yielded "true" at the end.

When the computation of the prefetch determination value is completed, verification of steps is executed at S1004 to S1011 and at S1013 to S1015. In the verification of each step, first it is determined at S1005 whether there is dictionary data for the next step. If there is dictionary data ("YES" at S1005), processing proceeds to S1006. Here the read-out unit 703 instructs the parameter changeover unit 706 to perform a parameter changeover. The read-out unit 706 responds by changing over the parameter. As a result of the changeover, it becomes possible for the execution unit 701 to perform pattern verification using the dictionary data necessary for the verification of the next step.

On the other hand, if it is found at S1005 that there is no dictionary data ("NO" at S1005), processing proceeds to step S1013 and whether prefetch is in progress is determined. If prefetch is in progress, processing proceeds to S1015 and the system waits for completion of prefetch. If prefetch is not in progress, processing proceeds to S1014 and parameter acquisition is performed. Then, at S1015, the system waits for parameter acquisition to be completed. It should be noted that parameter acquisition at S1014 is ordinary loading of a parameter and not prefetch of a parameter.

If it is found at S1015 that parameter acquisition has been completed by prefetch or parameter loading, processing proceeds to S1006. Here the read-out unit 703 instructs the parameter changeover unit 706 to perform a parameter changeover. The read-out unit 703 responds by changing over the parameter. As a result of the changeover, it becomes possible for the execution unit 701 to perform pattern verification using the dictionary data necessary for the verification of the next step.

At S1007, whether dictionary data for the next step is to be prefetched is determined. Execution of prefetch is determined if the next step number is a number smaller than the determination value acquired at S1003. If it is determined not to perform prefetch ("NO" at S1007), processing proceeds to S1009. If it is determined to perform prefetch ("YES" at S1007), processing proceeds to S1008 and prefetch of the parameter necessary for the next step is started. The read-out unit 703 issues a parameter (input) request. Verification is started at S1009 after issuance of the parameter (input) request.

When verification ends, the result of verification is evaluated at S1010. If the result is "true" ("YES" at S1010), processing proceeds to S1011 and it is determined whether verification of the step of the final stage has been completed. If the result of this determination is that verification of the step of the final stage has not been completed, processing returns to S1004 and verification of the next step is carried out. If it is determined at S1011 that verification of the step of the final stage has been completed, or if the result of processing is found to be "false" at S1010 ("NO" at S1010), processing proceeds to S1012 and it is determined whether recognition has been performed up to the data of the final rectangular image area. If recognition has been performed up to the data of the final rectangular image area has not been completed, processing returns to S1001 and recognition is carried out with regard to data of the next rectangular image area. On the other hand, if processing regarding the data of the final rectangular image area has been completed, then recognition ends.

In accordance with the second embodiment, by determining whether prefetch is to be performed using past processing history, needless prefetch can be reduced and waiting time due to parameter loading can be shortened.

<Third Embodiment>

Next, a third embodiment according to the present invention will be described in detail with reference to the drawings. The configuration of the information processing apparatus according to the third embodiment is the same as that of the information processing apparatus described in the second embodiment, although the operation of the determination unit differs.

In the second embodiment, reference is had to the processing log storage unit 702 to refer to the result of processing of the preceding frame of data of a rectangular image area currently undergoing processing and the result of this processing is output as is to the read-out unit 703 as the result of the determination.

In this embodiment, the determination unit 707 refers to the result of processing of the preceding frame in the vicinity of a rectangular image area currently undergoing processing, finds the average value of the result of processing and outputs the average value to the read-out unit 703 as the result of determination.

Here a case will be described in which the result of processing in the vicinity of one pixel of a rectangular image area currently undergoing processing is adopted as the result of determination. First, let (X,Y) be the address of a rectangular image area currently undergoing processing, where X represents the position of the image in the line direction and Y the position of the image in the column direction.

Using the processing log storage unit 702, the determination unit 707 refers to results of processing of rectangular image areas indicated by the following nine addresses of the preceding frame:
(X−1, Y−1), (X, Y−1), (X+1, Y−1)
(X−1, Y), (X, Y), (X+1, Y)
(X−1, Y+1), (X, Y+1), (X+1, Y+1)

In order to obtain the average of results of processing an area in the vicinity of one pixel, the determination unit 707 finds the sum of the nine processing results referred to and divides the sum by nine. In the vicinity of the edge of the image, there is a possibility that nine pixels of processing results will not be obtained. In such case, the sum only of the obtained processing results is taken and the sum is divided by the number of processing results obtained to thereby obtain the average value. Further, there is a possibility that the sum will be indivisible. In such case the result obtained is rounded down, rounded up or has its decimals dropped.

The determination unit 707 outputs the obtained average value to the read-out unit 703 and the read-out unit 703 performs parameter prefetch up to the step of this average value.

<Fourth Embodiment>

Next, a fourth embodiment according to the present invention will be described in detail with reference to the drawings. The configuration of the information processing apparatus according to this embodiment will be described with reference to FIG. 11. The configuration of the information processing apparatus of the fourth embodiment is obtained by adding a motion vector detecting unit 708 to the configuration of the information processing apparatus according to the second embodiment. Detection performed by the motion vector detecting unit 708 and the determination made by the determination unit 707 for determining whether to perform prefetch by referring to the result of detection will be described below.

Figure 11:
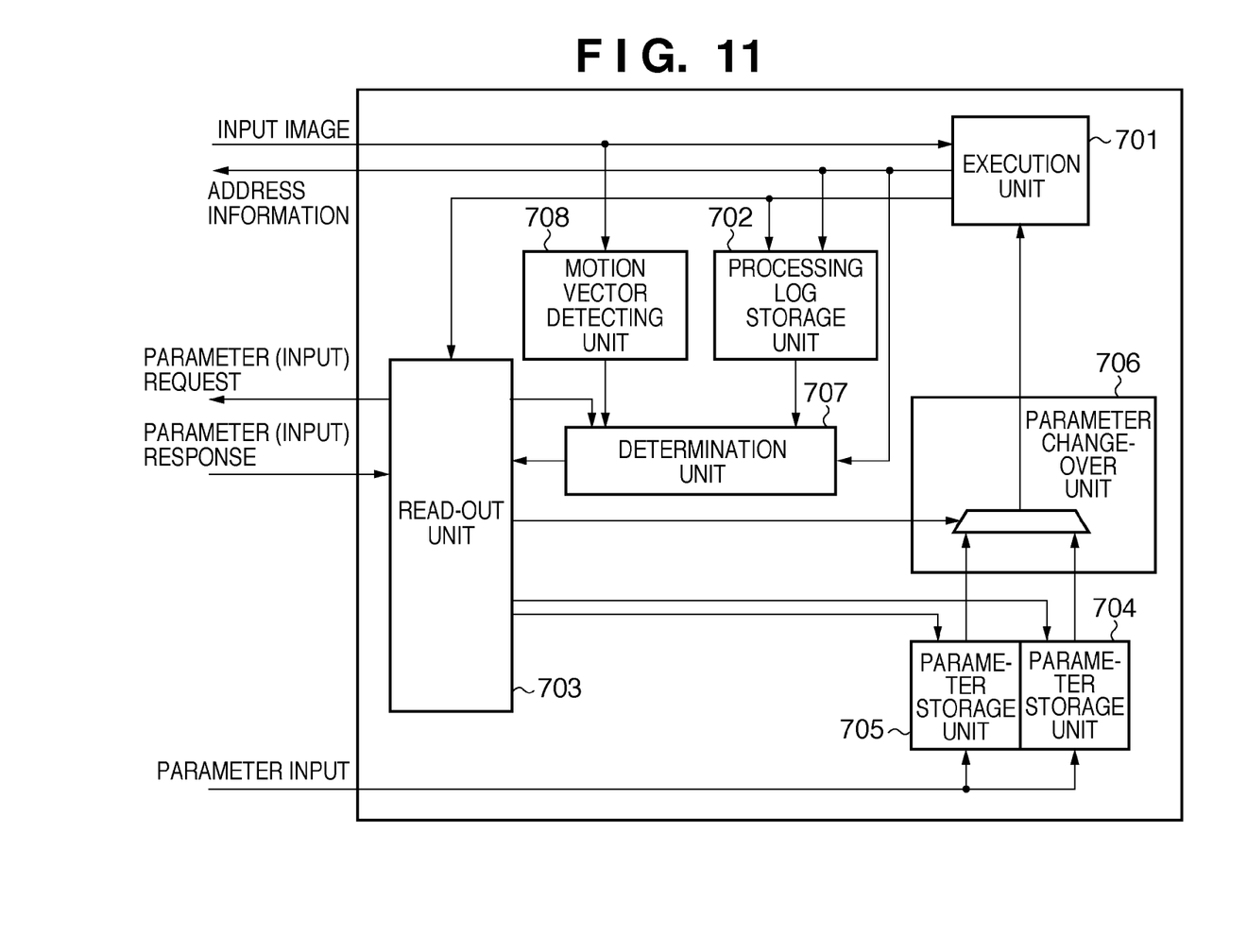
FIG. 11 is a block diagram illustrating the configuration of an information processing apparatus according to a fourth embodiment of the present invention.

The motion vector detecting unit 708 detects the motion vector of an object at each pixel between frames. The direction and magnitude of the motion vector at each pixel are obtained as the result of detection. For example, if the motion vector is +2 in the X direction of the image and −1 in the Y direction, then a result is obtained in the form (+2,−1).

Using the motion vector detecting unit 708, the determination unit 707 refers to the motion vector of a rectangular image area currently undergoing processing. Further, when reference is had to the result of processing the preceding frame being held in the processing log storage unit 702, the determination unit 707 adds an offset to the address of the reference destination using the motion vector to which reference has been had.

Here a case will be described in which the address of the rectangular image area currently undergoing processing is (X,Y) and the motion vector in this area is (+2,−1). In this case, the address to which the offset has been added becomes (X−2,Y+1). In the case where reference is had to the processing log storage unit 702 to refer to the result of processing the preceding frame, use is made of the address (X−2,Y+1) having the offset.

The determination unit 707 outputs the obtained processing result of the address having the offset to the read-out unit 703 and the read-out unit 703 performs parameter prefetch up to the step of the processing result of the address having the offset.

By thus adding an offset to the address of the reference destination using the motion vector, it is possible to apply a correction to the motion of an object and it is possible to predict motion with greater accuracy. In particular, since frame-to-frame correlation diminishes in a case where processing is executed upon downsampling frames or in a case where a fast-moving object is subjected to recognition, correction of motion is effective.

In the embodiments set forth above, it is stated explicitly that the parameter storage units 704 and 705 are separate. However, the invention may just as well be worked by distinguishing between separate areas in the same parameter storage unit.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-239869, filed Oct. 16, 2009, and Japanese Patent Application No. 2009-240872, filed Oct. 19, 2009, which are hereby incorporated by reference herein in their entirety.

What is claimed is:

1. An information processing apparatus for processing input data using multiple items of reference data in succession, comprising:
   a secondary storage unit configured to store the multiple items of reference data;
   a primary storage unit accessible at a speed higher than that of the secondary storage unit;
   a read-out unit configured to read out the reference data, which is used in the processing, from the secondary storage unit to the primary storage unit;
   an execution unit configured to execute processing of the input data using the reference data that has been read out to the primary storage unit;
   a determination unit configured to determine, based upon at least one of a probability that reference data scheduled for use by the execution unit will change and quantity of the scheduled reference data, whether the scheduled reference data is to be prefetched by the read-out unit, wherein the determination unit determines that prefetch is to be performed in a case where a function value of a function is smaller than a predetermined value, the function increasing in relation to the probability that the scheduled reference data will change and increasing in relation to the data amount of the scheduled reference data; and
   a control unit configured to control prefetch to be performed by the read-out unit based on the result of determination of the determination unit.

2. The apparatus according to claim 1, wherein the function value is the product of the probability that the scheduled reference data will change and the data amount of the scheduled reference data.

3. The apparatus according to claim 1, wherein the determination unit determines that prefetch is to be performed in a case where the data amount of the scheduled reference data is less than a predetermined amount of data.

4. The apparatus according to claim 1, wherein the determination unit determines that prefetch is to be performed in a case where the probability that the scheduled reference data will change is lower than a predetermined probability.

5. The apparatus according to claim 1, wherein the read-out unit omits read-out of reference data, which is already being held in the primary storage unit, from the second storage unit.

6. The apparatus according to claim 1, wherein the input data is image data;
   the processing is verification processing for performing recognition of an object in the image data;
   the reference data is dictionary data used in the verification processing; and
   the probability that the scheduled reference data will change is specified based upon results of learning carried out in advance using the dictionary data.

7. In an information processing apparatus having a secondary storage unit configured to store multiple items of reference data and a primary storage unit accessible at a speed higher than that of the secondary storage unit, an information processing method for processing input data using the multiple items of reference data in succession, the method comprising:
   reading out the reference data, which is used in the processing, from the secondary storage unit to the primary storage unit;
   executing processing of the input data using the reference data that has been read out to the primary storage unit;
   determining, based upon at least one of a probability that reference data scheduled for use in execution of the processing will change and data amount of the scheduled reference data, whether the scheduled reference data is to be prefetched, wherein it is determined that prefetch is to be performed in a case where a function value of a function is smaller than a predetermined value, the function increasing in relation to the probability that the scheduled reference data will change and increasing in relation to the data amount of the scheduled reference data; and
   prefetching the scheduled reference data in a case where prefetch has been determined at the determining.

8. A non-transitory computer-readable storage medium storing a computer program for causing a computer to function as the apparatus according to claim 1.

* * * * *